United States Patent [19]

Barnes et al.

[11] Patent Number: 5,018,838

[45] Date of Patent: May 28, 1991

[54] METHOD AND DEVICE FOR ACHIEVING OPTICAL SPATIAL PHASE MODULATION

[75] Inventors: Thomas H. Barnes; Kiyofumi Matsuda; Naotake Ooyama, all of Tsukuba, Japan

[73] Assignees: Agency of Industrial Science & Technology; Minstry of International Trade and Industry, both of Tokyo, Japan

[21] Appl. No.: 375,950

[22] Filed: Jul. 6, 1989

[30] Foreign Application Priority Data

Jul. 8, 1988 [JP] Japan ................... 63-171428

[51] Int. Cl.$^5$ ............................................. G02F 1/133
[52] U.S. Cl. ........................... 350/347 V; 350/331 R; 350/333; 350/345
[58] Field of Search ............... 350/347 V, 331 R, 333, 350/342, 351, 345, 338; 340/784, 765

[56] References Cited

U.S. PATENT DOCUMENTS

| | | | |
|---|---|---|---|
| 4,305,807 | 12/1981 | Somlyody | 350/331 R |
| 4,715,683 | 12/1987 | Gregory et al. | 350/331 R |
| 4,760,389 | 7/1988 | Aoki et al. | 350/345 |
| 4,850,675 | 7/1989 | Hatanaka et al. | 350/331 R |

FOREIGN PATENT DOCUMENTS 0081818 7/1981 Japan ...................... 350/347 V

Primary Examiner—Rolf Hille
Assistant Examiner—Tan Ho
Attorney, Agent, or Firm—Oblon, Spivak, McClelland, Maier & Neustadt

[57] ABSTRACT

Optical spatial phase modulation is achieved by positioning a liquid crystal layer in the path of a light beam to be modulated and controlling the spatial distribution of refractive index of the liquid crystal layer by controlling the spatial distribution of the electrical field generated across the liquid crystal layer.

5 Claims, 5 Drawing Sheets

METHOD AND DEVICE FOR ACHIEVING OPTICAL SPATIAL PHASE MODULATION

BACKGROUND OF THE INVENTION

1. Field of the Invention

This invention relates to a method and device for achieving optical spatial phase modulation. More particularly, it relates to an optical spatial phase modulating device that can be applied to optical correlators, aberration correctors, interferometers and in other such systems.

2. Prior Art Statement

Optical correlators based on the Van der Lugt system are well known. In the van der Lugt system, holographic techniques are used to produce a filter whose phase and amplitude characteristics are matched to the Fourier transform of a reference image. This filter is then used to filter the Fourier transform of a test image, and if the test and reference images contain the same components, then plane waves leave the filter at an angle corresponding to the matching positions of the test and reference components. A further inverse Fourier transform gives an output intensity distribution in which bright spots indicate the positions of matches between objects and reference images.

It has been found recently that if the amplitude information in the filter is discarded and only the phase information is retained, a much sharper correlation may be obtained than is possible with the Van der Lugt filter.

Achieving this requires a filter which modifies only the phase distribution of light passing through it. Furthermore, if this filter were to be made using an optical modulating device which is controlled by a computer, rather than by using a photographic plate or similar recording medium such as in a conventional system, the result would be an extremely flexible and easy-to-use optical processing system.

OBJECT AND SUMMARY OF THE INVENTION

The object of the present invention is to provide a method and device for achieving optical spatial modulation, which enables the phase distribution of a light beam passing through the modulating device to be changed as desired.

To attain the above object, the method for achieving optical spatial phase modulation according to the invention comprises the steps of positioning a liquid crystal layer in the optical path of a light beam to be modulated, and controlling the spatial distribution of the refractive index of the liquid crystal layer by controlling the spatial distribution of an electrical field generated across the liquid crystal layer to thereby modulate the spatial phase of the light beam.

The device according to the present invention, which is placed in the optical path of a light beam for achieving optical spatial modulation of the light beam, comprises first and second electrodes opposed to each other, a liquid crystal layer sandwiched between the first and second electrodes, the first and second electrodes being used to generate an electrical field across the liquid crystal layer, the second electrode comprising a plurality of sub-electrodes arranged in a matrix, means for allowing isolated energization of individual sub-electrodes, whereby the refractive index of the light crystal layer is changed locally by energizing the sub-electrodes.

When the modulating device is placed in the path of the light beam to be modulated and a voltage of a prescribed intensity is applied to specified individual sub-electrodes, the local orientation of the molecules in the liquid crystal layer undergoes a change that corresponds to the intensity of the electrical field generated across the liquid crystal layer, giving rise to local changes in the refractive index of the liquid crystal layer. As a result, local phase delays are introduced into a light beam passing through the liquid crystal layer, changing the phase distribution of the light.

By applying voltages to the sub-electrodes by means of a video signal, for example, generated under computer control, it is possible to readily change the refractive index of liquid crystal layer locations between opposed electrodes, thereby enabling a modulating device containing the desired phase distributions to be provided substantially on a real-time basis. By controlling the refractive index distribution of the liquid crystal layer of the optical spatial phase modulating device so that the distribution corresponds to a test or reference image, an image recognition system is readily provided which eliminates the need, such as in conventional systems, to prepare and change filters, markedly enhancing operating efficiency.

The above and other objects and features of the invention will become more apparent from the following detailed description with reference to the accompanying drawings.

DETAILED DESCRIPTION OF THE PREFERRED EMBODIMENTS

The basic configuration and operating principle of the optical spatial phase modulating device according to the present invention will now be described with reference to FIGS. 1 to 3.

Figure 1:
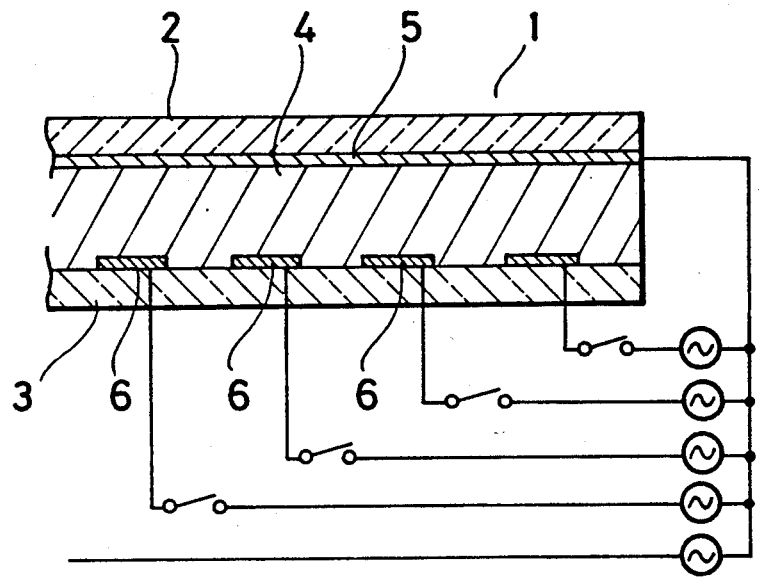
FIG. 1 is a cross-sectional view of an embodiment of an optical spatial phase modulating device according to the invention.

In FIG. 1, an optical spatial phase modulating device 1 is comprised of a liquid crystal layer 4 sandwiched between glass plates 2 and 3, with the distance between the glass plates being maintained by spacers (not shown). Provided in contact between the glass plate 2 and the liquid crystal layer 4 is a single large transparent electrode 5 which, made of, for example, ITO (Indium Tin Oxide), has good electrical and optical properties. Provided in contact between the glass plate 3 and the liquid crystal layer 4 opposite the transparent electrode 5 is a plurality of transparent sub-electrodes 6 arranged in the form of a matrix.

The liquid crystal layer (liquid crystal cell) used may either be one having a homeotropic arrangement in which the molecules are in a parallel alignment with respect to each other and the plane of the glass plates, or an arrangement in which the molecules adjacent to one plate are twisted relative to the molecules adjacent to the other plate.

Figure 2:
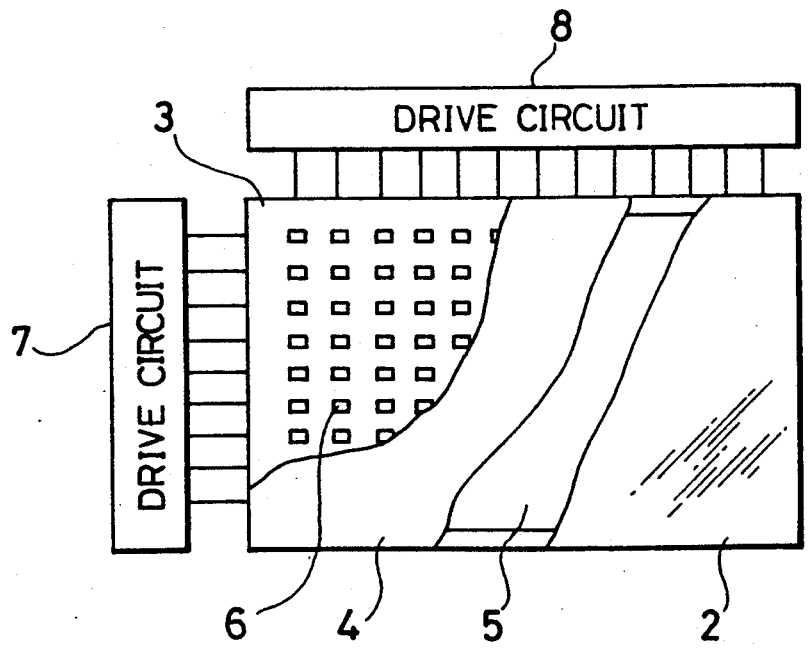
FIG. 2 is an explanatory view illustrating the wiring arrangement of the optical spatial phase modulating device shown in FIG. 1.

FIG. 2 illustrates an example of a wiring arrangement for the sub-electrodes 6. As shown, the electrodes are arranged in a matrix, with horizontally adjacent electrodes linked in series and connected at one end to a scanning electrode drive circuit 7 and vertically adjacent electrodes being likewise linked together in series and connected at one end to a signal electrode drive circuit 8. This arrangement is substantially the same as that used in commercial liquid crystal cells, with modifications to enable the cells to be utilized in the present invention.

When a prescribed voltage based on a video signal from an image processor is applied to a specific line of sub-electrodes connected to the scanning electrode drive circuit 7 and the signal electrode drive circuit 8, the sub-electrode located at the intersection of the two lines is energized by a potential that is the sum of the potentials of the two circuits 7 and 8. The molecular alignment of the liquid crystal layer 4 located between the electrodes is then changed, changing the effective refractive index of the layer, by controlling the electrical field generated between the particular subelectrode 6 and the electrode 5.

In the same way, the molecular alignment is changed by applying a potential of a specific intensity to the sub-electrodes 6 that is based on a video signal in order to generate an electrical field and produce local changes in the effective refractive index of the liquid crystal layer 4 and form a refractive index distribution on the liquid crystal layer 4 that corresponds to the video signal.

Figure 3:
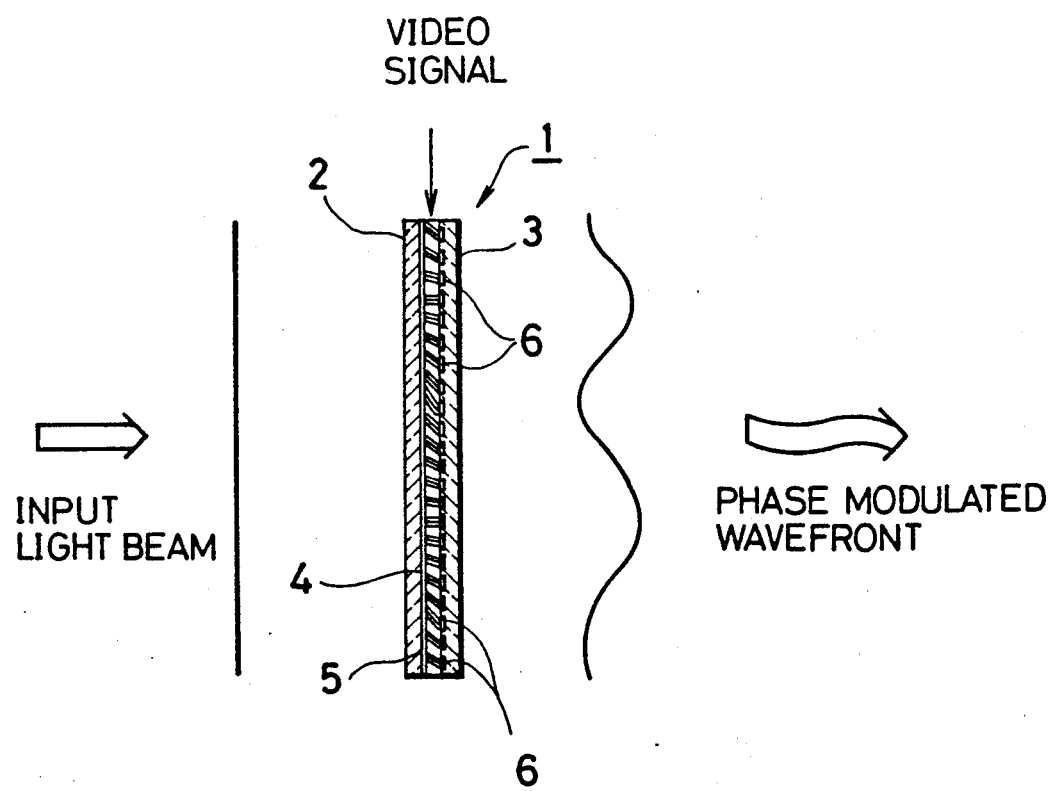
FIG. 3 is an explanatory view showing the phase modulation of the incident light wavefront by the phase modulating device of FIG. 1.

As shown with reference to FIG. 3, when a plane wave impinges on the liquid crystal layer 4, light passing through the liquid crystal layer 4 is phase modulated, as light passing through an area having a high refractive index will be phase delayed with respect to light passing through an area having a low refractive index.

Thus, the optical spatial phase modulating device according to the present invention allows only the spatial phase of the light to be changed with ease and certainty. The response time of the modulating device depends on the response time of the liquid crystal and is typically about 100 msec, enabling the refractive index distribution of the liquid crystal layer to be rapidly changed as desired.

An embodiment of the optical spatial phase modulating device employing a twisted liquid crystal layer in accordance with the present invention, applied to an optical correlator, will now be described with reference to FIG. 4.

Figure 4:
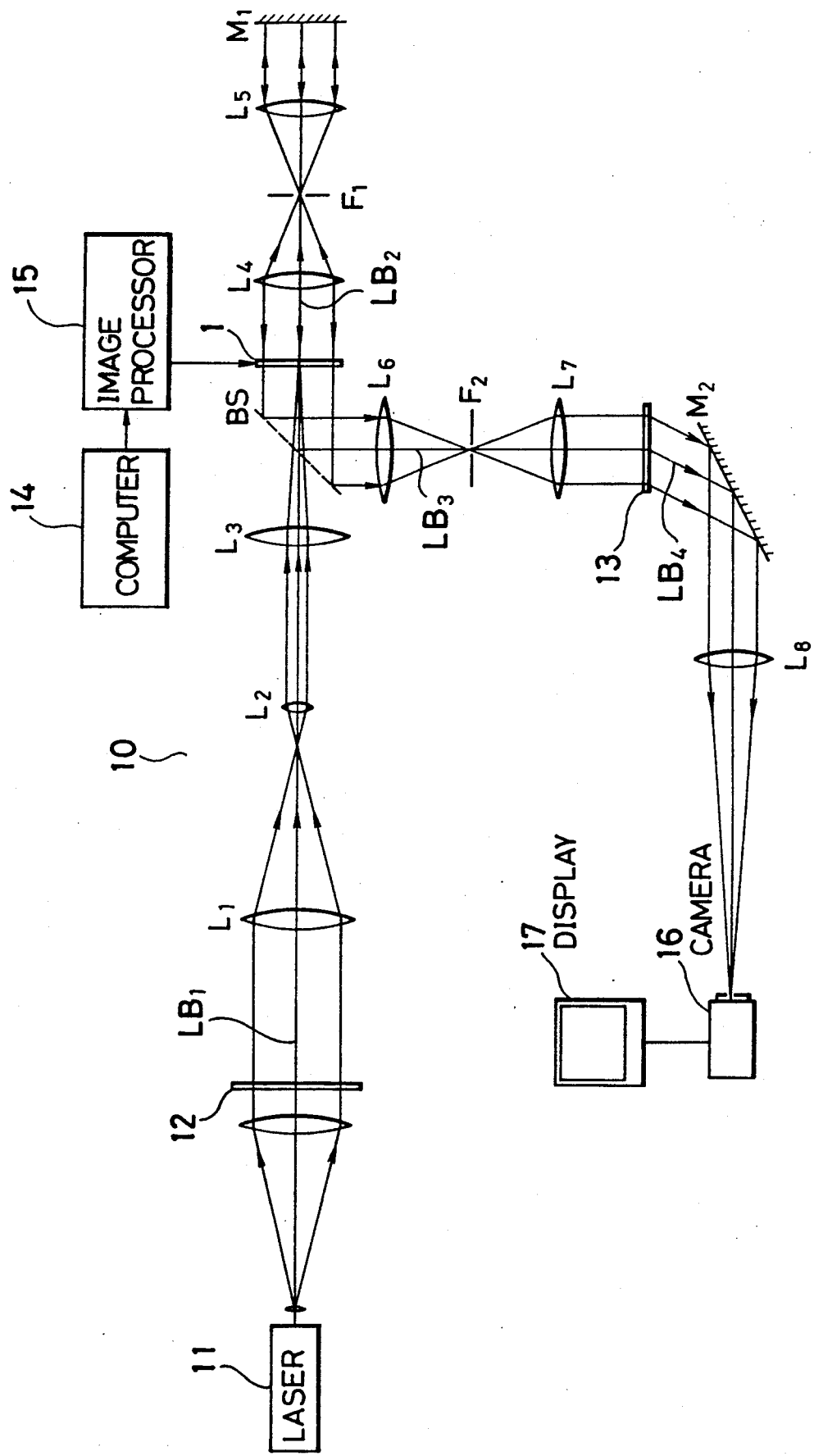
FIG. 4 is a schematic diagram of an embodiment of an optical correlator using the optical spatial phase modulating device of the invention.

In FIG. 4, an optical correlator denoted by reference numeral 10 is provided with a transparency plate 12 on which an input image is written, lenses $L_1$ to $L_3$, a beam splitter BS, an optical spatial phase modulating device 1 on which the inverse phase distribution of the Fourier transform of a reference image is displayed, a lens $L_4$, a filter $F_1$, a lens $L_5$, a mirror $M_1$, a lens $L_6$, a filter $F_2$, a lens $L_7$, a hologram 13, a mirror $M_2$, a lens $L_8$, a camera 16, a display 17, a computer 14 and an image processor 15.

A beam of light from a laser 11 is expanded by an optical beam expander system and collimated to form a parallel beam which passes through the transparency plate 12 on which the input image has been written. The transparency plate 12 may be any means by which the spatial modulation of the incident light, phase or intensity, may be achieved.

The lens $L_1$ produces a Fourier transform of the input image contained in the light beam $LB_1$ that has passed through the transparency plate 12. This Fourier transform is expanded by the lenses $L_2$ and $L_3$ and passed via the beam splitter BS to produce a large Fourier transform on the liquid crystal layer of the optical spatial phase modulating device 1.

In accordance with instructions issued by the computer 14, the inverse phase distribution of the Fourier transform of a reference image is formed as a specific refractive index distribution on the liquid crystal layer of the optical phase modulating device 1, from a video signal provided by the image processor 15. If the light of the beam incident on the modulating device contains a phase distribution that is complementary to this. Phase compensation takes place giving rise to a plane wave.

Figure 5:
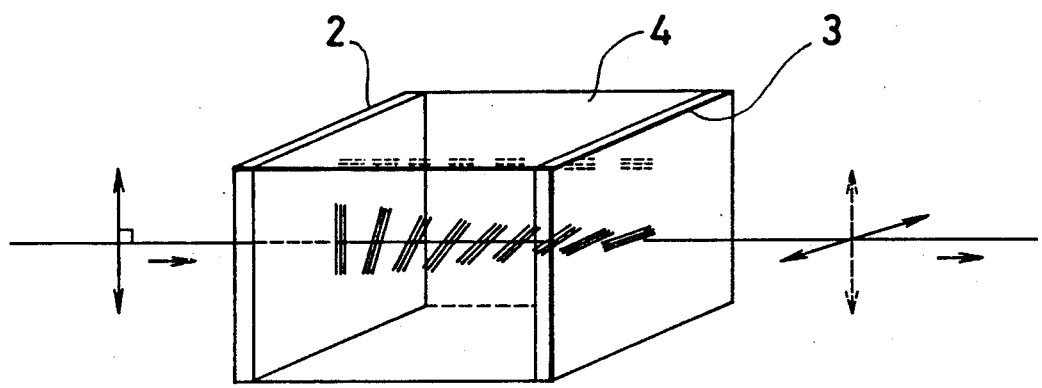
FIG. 5 is an explanatory view showing the molecular arrangement of the liquid crystal layer of the optical correlator shown in FIG. 4.

As has been described, nematic twisted liquid crystal is used for the liquid crystal layer 4 so that, as shown in FIG. 5, the polarization of the light beam prior to its passage through the liquid crystal layer 4 and the polarization of the light beam after it has passed through the liquid crystal layer 4 will differ by an amount that corresponds to the angle of twist of the liquid crystal molecules (90° in the case of the illustrated embodiment). The light beam is then condensed by the lens $L_4$, passes through the spatial filter $F_1$ and is collimated by the lens $L_5$ and reflected by the mirror $M_1$, and passes back through the lens $L_5$, filter $F_1$ and lens $L_4$ to impinge on the optical spatial phase modulating device 1. The optical system comprising lenses $L_4$, $L_5$, and mirror $M_1$ is arranged to image each portion of the optical spatial phase modulating device back onto itself.

The light beam returning back through the liquid crystal layer 4 is twisted through an angle that is the same as the angle through which it was twisted on its first passage through the liquid crystal layer, but in the opposite direction, thereby eliminating the effect of the molecular twist in the liquid crystal layer 4.

The arrangement is not restricted to the use of liquid crystal in which the molecules are aligned perpendicularly to the plane of the glass plates; liquid crystal elements having other molecular alignments than the above may also be used.

The light beam $LB_3$ issuing from the optical spatial phase modulating device 1 is split by the beam splitter BS, and one part is condensed by the lens $L_6$ and passed through the filter $F_2$ to remove unwanted diffracted orders originating from the electrode grating structure of the optical spatial phase modulating device 1, and is then collimated by the lens $L_7$ and impinges on the hologram 13.

The hologram 13 is provided to correct for nonuniformities in the thickness of the glass plates 2 and 3 and the liquid crystal layer, i.e., the optical path length. Manufacturing the glass plates and liquid crystal layer to an optical order of thickness uniformity is difficult and costly. The hologram 13 therefore is made by passing light through the glass plates and liquid crystal layer actually used, and as a result light beam aberrations introduced by the optical spatial phase modulating device 1 are cancelled out when the light beam $LB_3$ is passed through the hologram 13, producing a light beam $LB_4$ that is free of aberrations. A Fourier transform lens $L_8$ produces a Fourier transform on the lens of the camera 16 from the light beam $LB_4$ deflected by the mirror $M_2$.

If the reference image contains an input image that is the same as the input image contained in the incident light beam, a plane wave is formed, as described above, and the position of each image is displayed on the display 17.

Figure 6:
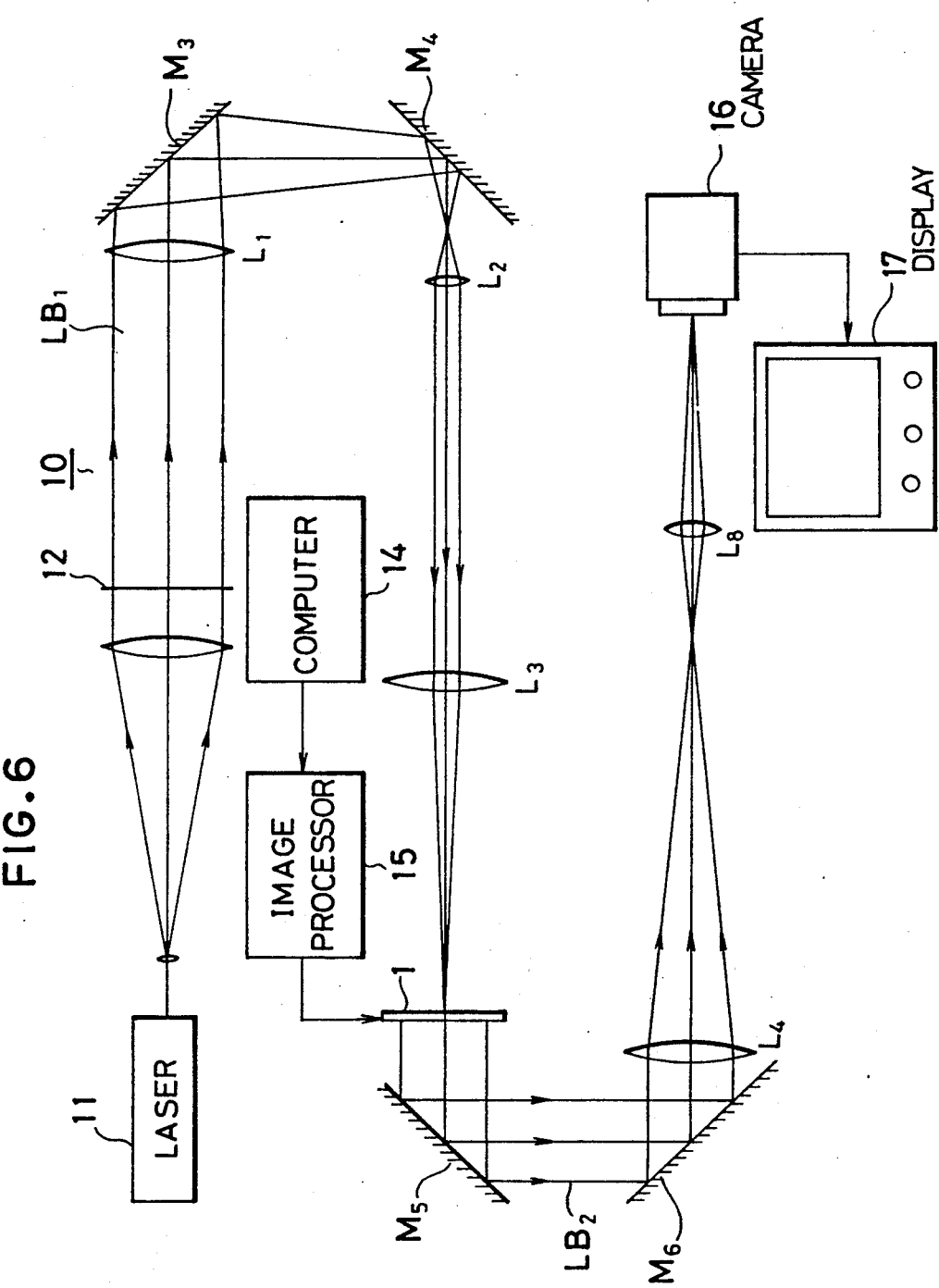
FIG. 6 is a schematic view showing another embodiment of the optical correlator using the optical spatial phase modulating device of the present invention.

An embodiment will now be described with reference to FIG. 6 in which, in accordance with the present invention, an optical spatial phase modulating device employing a liquid crystal layer with a homeotropic molecular arrangement in which the molecules are aligned parallel to each other and to the plane of the glass plates used in an optical correlator.

Except for the lack of filters $F_1$ and $F_2$ and the hologram 13, the optical correlator 10 of this embodiment is substantially the same as the optical correlator 10 illustrated in FIG. 4. A beam of light from the laser 11 is expanded by the optical beam expander and collimated to form a parallel beam which is passed through the transparency plate 12 on which the input image has been written, to produce a light beam $LB_1$ which contains the input image. The light beam $LB_1$ is Fourier transformed by lens $L_1$, deflected through 180° by mirrors $M_3$ and $M_4$, expanded by lenses $L_2$ and $L_3$, to form a large Fourier transform at the plane of the liquid crystal layer of the optical spatial phase modulating device 1.

In accordance with instructions issued by the computer 14, the inverse phase distribution of the Fourier transform of a reference image is formed as a specific refractive index distribution on the liquid crystal layer of the optical spatial phase modulating device 1 from a video signal provided by the image processor 15.

Figure 7:
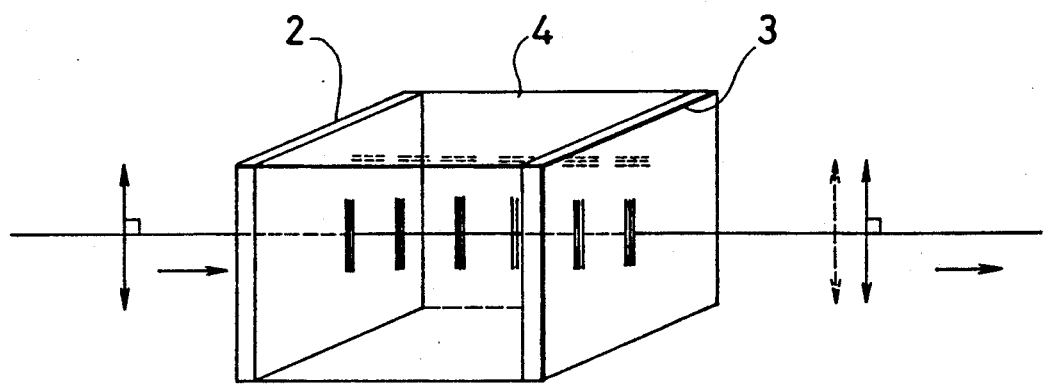
FIG. 7 is an explanatory view showing the molecular arrangement of the liquid crystal layer of the optical correlator shown in FIG. 6.

The light beam impinging on the liquid crystal layer 4 leaves the liquid crystal layer as a wavefront phase modulated by differences in the refractive index of the liquid crystal layer. Because the liquid crystal layer has a non-twisted molecular arrangement, as shown in FIG. 7, the polarization of the light leaving the liquid crystal layer is the same as the polarization of the incident light. The optical path of the light beam $LB_2$ is deflected 180° by the mirrors $M_5$ and $M_6$ and the beam is inversely Fourier transformed by lens $L_4$, and by means of lens $L_8$ forms an output correlation image on the sensor of the camera 16.

When the input image written in the input plane 12 contains an image that is the same as the reference image from which the phase distribution written on the liquid crystal layer of the modulating device 1 is derived, a plane wave is formed as described above which gives rise to a focused correlation spot whose position is shown on the display 17.

It is to be understood that the number and location of the various lenses and mirrors in the optical correlator are not limited to those described in the configuration of the embodiments described above, but may differ in accordance with intended applications and conditions. Also, the optical spatial phase modulating device according to the invention is used in a filter containing the inverse phase distribution of the Fourier transform of a reference image, but a transparency plate containing this phase distribution may also be used.

As has been explained above, in the optical spatial phase modulating device according to the present invention the refractive index of the liquid crystal layer is controlled on the basis of a video signal, to thereby control the phase of the incident light beam, resulting in a very short response time, and as the video signal can be readily controlled by computer, by using it as the test image or reference filter of an optical correlator. Thus an extremely fast optical correlator can be realized in which there is no need to produce a hologram using photographic plates or such a recording medium such as in the case of the conventional system.

The optical spatial phase modulating device of the present invention is not limited to the abovedescribed optical correlator, but may also be used as the phase modulating device of an interferometer for detecting and correcting aberrations introduced during the formation of spherical and aspherical surfaces and wavefronts, providing a major improvement in detection capabilities with a much shorter detection time.

What is claimed is:

1. A method for modulating an optical spatial phase of a light beam, comprising the steps of:
   providing a liquid crystal layer having a plate electrode on a first surface thereof and a plurality of sub-electrodes in a second surface thereof opposed to said first surface;
   applying a potential of a specific intensity to each of said plurality of sub-electrodes to produce local changes in an alignment of molecules of said liquid crystal layer between said plate electrode and each of said plurality of sub-electrodes and form a prescribed refractive index distribution in said liquid crystal layer; and
   passing a light beam through said liquid crystal layer to modulate an optical spatial phase of said light beam in accordance with said prescribed refractive index distribution.

2. An apparatus for modulating an optical spatial phase, comprising:
   a liquid crystal layer having first and second surfaces opposed to each other;
   a plate electrode formed on said first surface of said liquid crystal layer;
   a plurality of sub-electrodes arranged in a matrix and formed on said second surface of said liquid crystal layer;
   means for applying a potential of a specific intensity to each of said plurality of sub-electrodes;
   wherein said potential is applied to each of said plurality of sub-electrodes to produce local changes in an alignment of molecules of said liquid crystal layer between said plate electrode and each of said plurality of sub-electrodes and form a prescribed refractive index distribution in said liquid crystal layer, and in this state a light beam is allowed to pass through said liquid crystal layer to modulate an optical spatial phase of said light beam in accordance with said prescribed refractive index distribution.

3. An optical correlator comprising:
   a light source;
   a transparency plate receiving a light beam from said light source and having an input image written thereon;

first means for Fourier transforming said light beam including said input image from said transparency plate;

an optical spatial phase modulating element including a liquid crystal layer having first and second surfaces opposed to each other, a plate electrode formed on said first surface of said liquid crystal layer, a plurality of sub-electrodes formed on said second surface of said liquid crystal layer and means for applying a potential of a specific intensity to each of said plurality of sub-electrodes to produce local changes in an alignment of molecules of said liquid crystal layer between said plate electrode and each of said plurality of sub-electrodes and form a prescribed refractive index distribution in said liquid crystal layer;

wherein said optical spatial phase modulating element receives the Fourier transformed light beam from said first means to pass the received light beam through said liquid crystal layer and modulate an optical spatial phase of the passed light beam in accordance with said prescribed refractive index distribution;

second means for fourier transforming the light beam modulated in the optical spatial phase from said optical spatial phase modulating element; and image displaying means for displaying thereon the light beam Fourier transformed by said second means.

4. An optical correlator according to claim 3, further comprising a reflector for reflecting the light beam from said optical spatial phase modulating element onto said optical spatial phase modulating element.

5. An optical correlator according to claim 3, further comprising a hologram prepared by the light beam passed through said liquid crystal layer and disposed in an optical path for the light beam from said optical spatial phase modulating element.

* * * * *

UNITED STATES PATENT AND TRADEMARK OFFICE
CERTIFICATE OF CORRECTION

PATENT NO. : 5,018,838

DATED : May 28, 1991

INVENTOR(S) : Thomas H. Barnes et al.

It is certified that error appears in the above-identified patent and that said Letters Patent is hereby corrected as shown below:

Title page item (73):

The Assignee information is incorrect, should be, --Agency of Industrial Science & Technology, Ministry of International Trade & Industry, Tokyo Japan--.

Signed and Sealed this

Fifteenth Day of December, 1992

*Attest:*

DOUGLAS B. COMER

*Attesting Officer*   Acting Commissioner of Patents and Trademarks